(No Model.)
R. M. HUNTER.
ELECTRIC RAILWAY.
No. 384,908. Patented June 19, 1888.
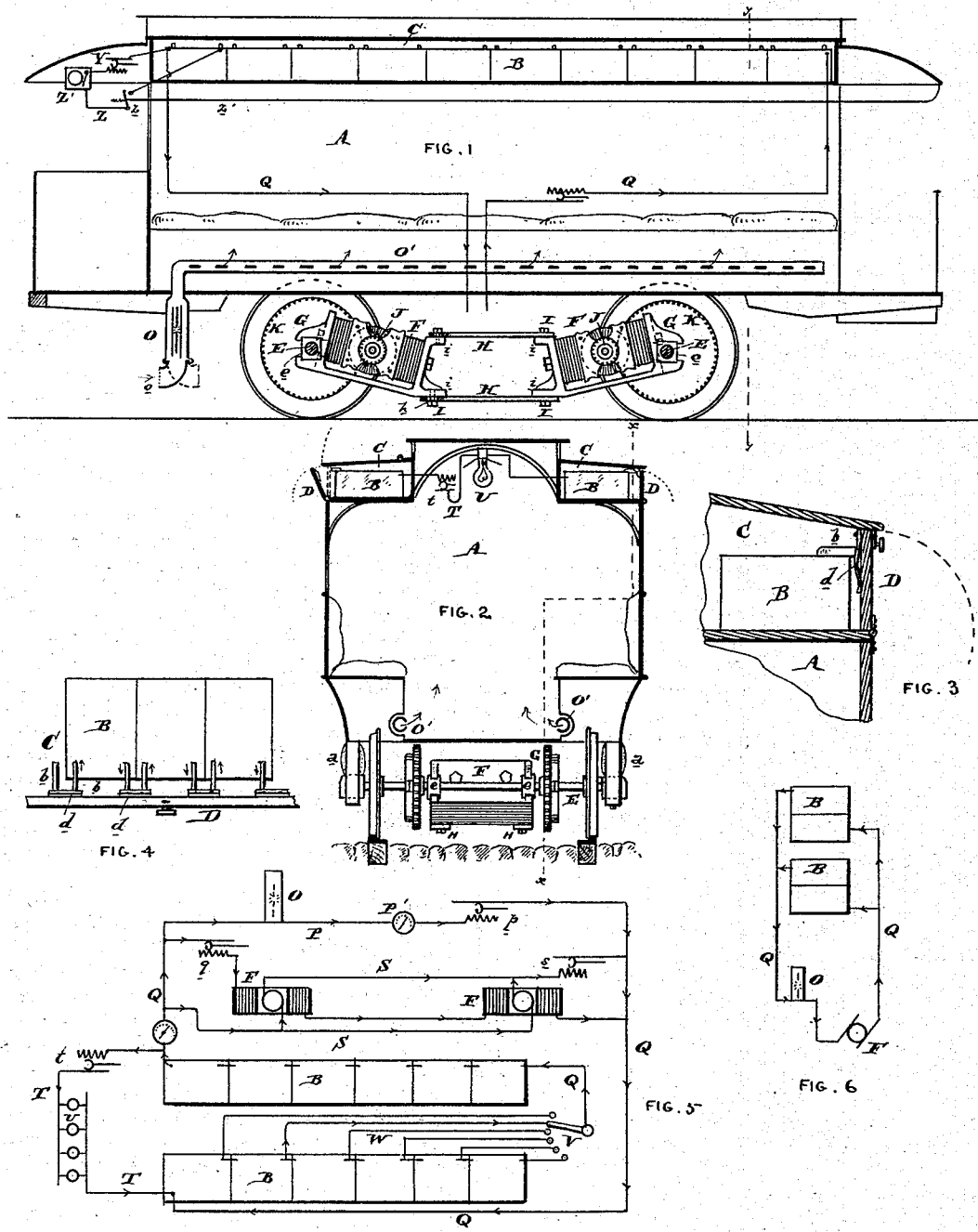
Attest.
E. H. Breckinred.
E. McDermott.
Inventor
R. M. Hunter

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 384,908, dated June 19, 1888.

Application filed June 10, 1887. Serial No. 240,880. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways; and it consists in certain improvements, all of which are fully set forth in the following specification, and shown in the accompanying drawings, which form part thereof.

My invention contemplates a novel arrangement of secondary battery on the car.

In the drawings, Figure 1 is a sectional side elevation on line $x$ $x$ of a street-car embodying my invention. Fig. 2 is a cross-section of same on line $y$ $y$. Fig. 3 is an enlarged view of the upper right-hand corner of Fig. 2, showing the method of coupling up the secondary-battery cells by closing the door to the compartment. Fig. 4 is a plan view of same. Fig. 5 is a diagram showing the arrangement of circuits. Fig. 6 is a diagram showing a modification of same so far as the connection of the motor, battery, and electric heater are concerned.

A is the car-body, and may be supported upon the axles by means of springs $a$, in the ordinary way.

C are compartments upon the roof of the car, on each side, and provided with doors D. These doors may be hinged to the car-body, if desired, and are preferably so, but not necessarily, and, in place of being arranged vertically on the sides, may be on the roof.

B are the secondary batteries, which are placed within the compartments C and coupled up in any suitable manner. As shown, the batteries have their terminals brought to the front, as at $b$, and the doors D are provided with contact-strips $d$, preferably formed of springs which, when the door is closed, couple up the different cells of the battery. (See Figs. 3 and 4.)

The secondary or other battery is supported by the car-body, and is therefore on springs, and can ride easily over the road and without spilling its solution despite its large weight, while the motor is preferably supported positively by the axles and independent of the car-body.

A feature of locating the batteries on each side is to bring them directly above the wheels, whereby the downward thrust is through the plane of the wheels, and is therefore not liable to strain the vehicle.

The support of the secondary battery upon springs is an important feature, and, as far as I am aware, was entirely novel at the date of my invention.

E are the axles.

F are two electric motors, preferably arranged at an angle to the road, for reasons hereinafter explained. These motors are connected together by connecting-bars H, having slots $h$, through which the clamping-bolts I, screwed into or connecting with the flanges $i$ of the motors, pass. By this means the motors themselves act as their own support and additional frames are not required, and the distance apart of the motor shafts may readily be adjusted. The distant ends of the motors are provided with guide-jaws G, in which brass boxes $e$ are fitted to receive the axles E.

The motor-shafts have pinions J upon their ends which mesh with spur-wheels K on the axles.

Q is the motor-circuit for supplying the current from the secondary batteries B to the motors, and is provided with a resistance-changer, $q$, to regulate the strength of the field-magnets thereof. An armature-circuit, S, is arranged in shunt relation to the field-magnets, and has a resistance-changer, $s$. By this means the armatures and field-magnets may be independently regulated. As shown, the field-magnets of the two motors are in series and the armatures in multiple connection. This gives simultaneous regulation and keeps down the armature-resistance.

The motors may be connected up in any other suitable manner, if desired.

The batteries may be connected in series or multiple series, the former being shown in Fig. 5 and the latter in Fig. 6, the system to be employed being dependent upon the watts required for the necessary horse-power of the motors and the volume and tension of the current available from the battery-cells. If desired, all the cells need not be coupled in circuit at the start, but may be coupled in from time to time by a switch, V, connecting with circuits $w$, leading to different cells. This switch can be manipulated by hand as the indicator X in the motor-circuit may direct. By this means the strength of the current of the battery may be kept up.

Z is a signal-circuit connecting with the poles of one cell of battery B, and includes an electric bell, Z', and a circuit maker and breaker, z, which may be operated by a cord, z', passing into the car. While one cell would be amply sufficient, more cells could be employed, if so desired.

A resistance-changer, Y, may be employed to regulate the current when the battery is fully charged that passes over the signal-circuit Z.

O is an electric heater of any suitable construction, and is provided with a draft-nozzle, o, which may be adjustable to point in the direction of the car, and may be covered, if desired, with wire-gauze to keep out dirt. The air so collected is passed through the heater and guided through perforated pipes O', and finally escapes through the holes in said pipes into the interior of the car. These pipes O' are preferably arranged in recesses under the seats, Fig. 2, extending from one end of the car to the other. The heater is preferably located beneath the car, but of course may be located anywhere on the car found as convenient. This heater may be in series circuit with the motors, as shown in Fig. 6, or in multiple connection, as shown in Fig. 5. In this latter arrangement P is the heater-circuit, and is provided with an indicator, P', to indicate the current flowing through the heater, and p is a resistance-changer to vary the current to control the temperature of the heater.

T is an electric-light circuit having a resistance-changer, t, and lamps S U, and receives its current from the secondary battery.

It is evident that the method of coupling up the battery by the door D may be employed irrespective of the location of the batteries on the car, and likewise the advantage of placing the batteries in the plane of the wheels is the same if the batteries were placed lower down than as shown.

The details may be modified in various ways without departing from my invention.

Any matters herein shown but not claimed are not dedicated to the public, but form subject-matter for other applications.

In this application I do not claim the batteries arranged in compartments in the plane of the wheels, nor the electric heating apparatus, nor the signal operated with a small portion of the battery required for the motor, as these matters form subjects-matter of my applications No. 271,923, of 1888, and No. 250,842, of 1887. Neither do I claim in this application a source of electric supply with two motors and independent regulating means for the armatures and field-magnets, nor separate motors for each axle, as these matters form subjects-matter of my applications No. 214,309, of 1886, No. 217,346, of 1886, No. 225,498, of 1887, No. 228,533, of 1887, and No. 239,930, of 1887.

Having now described my invention, what I claim as new, and desire to secure by Letters Patent, is—

1. The combination of a vehicle-body supported on springs and having two compartments located one on each side of the vehicle-body in the plane of the wheels, running-gear therefor, an electric motor supported thereon and connecting with the axles, an electric circuit connecting both batteries with the electric motor, and a single regulating apparatus to control the current flowing from both batteries to the motor.

2. The combination of a vehicle-body supported on springs and having two compartments located one on each side of the vehicle-body in the plane of the wheels, running-gear therefor, an electric motor supported thereon and connecting with the axles, an electric circuit connecting both batteries with the electric motor, a single regulating apparatus to control the current flowing from both batteries to the motor, and a cut-out device to cut out or in one or more cells of the batteries.

3. The combination of an electrically-propelled vehicle, two sets of batteries on said vehicle, the cells of one of said batteries being coupled in series with the cells of the other battery, a switch device to cut in or out one or more of the cells of one of the batteries, an electric motor, and a circuit connecting the motor in series with the two batteries.

4. The combination of an electrically-propelled vehicle, two sets of batteries on said vehicle, the cells of one of said batteries being coupled in series with the cells of the other battery, a switch device to cut in or out one or more of the cells of one of the batteries, an indicator to indicate the current strength of the batteries to direct the movement of the switch, an electric motor, and a circuit connecting the motor in series with the two batteries.

In testimony of which invention I hereunto set my hand.

RUDOLPH M. HUNTER.

Witnesses:
E. M. BRECKINREED,
RICHD. S. CHILD, Jr.